United States Patent [19]

Tomson

[11] 4,207,930
[45] Jun. 17, 1980

[54] METHODS AND APPARATUS FOR USE IN DISPENSING DYNAMOELECTRIC MACHINE LUBRICANT MATERIAL

[75] Inventor: James M. Tomson, Fort Wayne, Ind.

[73] Assignee: General Electric Company, Fort Wayne, Ind.

[21] Appl. No.: 946,568

[22] Filed: Sep. 28, 1978

[51] Int. Cl.$^2$ ............................ B65B 3/04; B65B 3/10
[52] U.S. Cl. ......................................... 141/1; 141/258
[58] Field of Search ............ 141/2, 18, 125, 183–191, 141/250–284, 301, 302, 1, 98; 184/1

[56] References Cited

U.S. PATENT DOCUMENTS

| | | | |
|---|---|---|---|
| 2,966,459 | 12/1960 | Abel | 141/125 |
| 3,226,801 | 1/1966 | Abel | 141/125 |
| 3,466,244 | 9/1969 | Abel | 141/125 |
| 3,788,370 | 1/1974 | Hare | 141/125 |
| 3,894,956 | 9/1975 | Whitt | 141/125 |

Primary Examiner—Houston S. Bell, Jr.
Attorney, Agent, or Firm—Ralph E. Krisher, Jr.

[57] ABSTRACT

A method of cutting off the flow of material being extruded from a dispensing head is disclosed. The method involves interrupting the flow of material by shearing the material in a direction transverse to its direction of flow at the end of a dispensing cycle. In addition, the method involves tightly closing the extrusion openings of dispensing apparatus. Apparatus embodying the invention readily utilized with a variety of different types of equipment and in conjunction with end frames of differing sizes and configurations. The apparatus may be constructed such that auxiliary power means are not required in order to perform the flow control function.

8 Claims, 3 Drawing Figures

METHODS AND APPARATUS FOR USE IN DISPENSING DYNAMOELECTRIC MACHINE LUBRICANT MATERIAL

CROSS REFERENCE TO RELATED APPLICATIONS

This application is generally related to the same subject matter as co-pending applications having Ser. Nos. 946,569; 946,553; and 946,554; all of which were filed on the same day as this application and are commonly assigned herewith. The above-referenced applications Ser. Nos. 946,569 and 946,554 are both filed in the names of James M. Tomson and Richard C. Bohde, whereas the above-referenced application Ser. No. 946,553 is filed in the name of Larry W. Stoner. The disclosures of all of these related applications are hereby incorporated by reference.

BACKGROUND OF THE INVENTION

The present invention relates generally to methods and apparatus for use while charging lubricant retaining and wicking material in consistent amounts cleanly and with a minimum amount of messiness into bearing lubricant reservoirs—such as, for example bearing reservoirs of fractional horsepower motors.

The above-referenced applications describe many of the problems in the material handling and moving application art, and especially the art concerning materials that are readily compressible or damaged during handling or dispensing operations. Materials of the type of primary consideration when considering the present invention are those that are made, for example, according to the commonly assigned Whitt U.S. Pat. No. 3,894,956 which issued July 15, 1975; and those made pursuant to Abel U.S. Pat. No. 2,966,459 of Dec. 27, 1960 or other materials marketed under the trade name "Permawick" by the Permawick Company Inc. There are numerous patents in the art related to injectable lubricating material in addition to the Whitt and Abel patents mentioned hereinabove. For example, Abel U.S. Pat. No. 3,466,244 which issued Sept. 9, 1969; and Abel U.S. Pat. No. 3,226,801 which issued Jan. 4, 1966 describe materials, and equipment for producing materials, respectively.

Historically, equipment utilized for injecting or metering flowable wicking and lubricating materials has been available commercially from the Permawick Company (or companies affiliated with Permawick) and in such equipment, a metering head having a nozzle is lowered into position with the lubricant retaining reservoir of a dynamoelectric machine end shield. At the end of an injection cycle, the nozzle is then raised from the end shield structure and preparation is made for for injecting lubricant retaining and wicking material into another dynamoelectric machine end shield.

The lubricating materials used typically include a lubricant mixed with a lubricant retaining material—such material being referred to herein as a carrier or matrix material. I have found that when commercially available equipment is used for injecting this type of material, it is difficult to accurately and precisely control the flow of material (or oil, per se) at the end of a dispensing cycle. More specifically, I have observed that this type of material will tend to ooze or exude from the prior art nozzles and contribute to messy work locations. In addition, with some product lines, the presence of excess oil or exudate from the nozzle on an end shield would be very objectionable to a purchaser of motors utilizing such end shield and time and labor must be expended in order to remove the excess oil or other exudate from the end shield. It is believed that part of this problem is associated with the fact that the oil and matrix material is extruded from small openings and the flow of the material being extruded does not respond instantaneously to the removal of extrusion pressures therefrom.

Accordingly, it would be desirable to provide new and improved methods of cutting off the flow of extrudable lubricants, and apparatus useful in practicing such methods; so that unwanted exudates may be minimized or eliminated. It would be particularly desirable to provide such methods and apparatus which could be easily utilized in conjunction with the methods and apparatus known in the prior art as well as the methods and apparatus described in the above-referenced Stoner application and the above-reference Tomson and Bohde application. It would also be desirable to provide new and improved nozzle flow control techniques for materials of the type under consideration herein which could be utilized easily and economically with various end frames.

SUMMARY OF THE INVENTION

Accordingly, it is a general object of the present invention to provide new and improved methods and apparatus for controlling the flow of extruded lubricant materials whereby the difficulties and problems associated with other approaches in the art are overcome.

A more specific object of the present invention is to provide new and improved methods and apparatus for controlling the flow of extrudable lubricants whereby the material flow path of the extruded material is interrupted by shearing the material in a direction transverse to the direction of material flow.

Another more specific object of the present invention is to provide new and improved methods and apparatus for controlling the flow of extrudable lubricant material in conjunction with a number of different types of apparatus.

A still more specific object of the present invention is to provide new and improved methods and apparatus for controlling the flow of lubricant and lubricant wicking material which may be readily adapted for a number of different dynamoelectric machine end frames.

In carrying out the above and other objects of the invention, in one preferred form, I provide a method of cutting off the flow of material being extruded from a dispensing head. In a preferred method, I interrupt the flow of material by shearing the material in a direction transverse to its direction of flow at the end of a dispensing cycle. In addition, I provide a method which involves tightly closing the extrusion openings of dispensing apparatus. Apparatus embodying the invention, in a preferred form thereof, may be readily utilized with a variety of different types of equipment and may be utilized in conjunction with end frames of differing sizes and configurations. In addition, apparatus embodying the invention in a preferred form may be constructed such that auxiliary power means are not required in order to perform the flow control function.

The subject matter which is regarded as my invention is particularly pointed out and distinctly claimed in the concluding portion of this specification. The invention itself, however, together with further objects and advantages thereof, may be best understood by reference to the following description taken in conjunction with the accompanying drawing wherein like reference numerals have been utilized to denote like parts.

BRIEF DESCRIPTION OF THE DRAWING

FIG. 2 also illustrates, with lines 1—1, the relationship of FIG. 1 to FIG. 2.

DESCRIPTION OF THE PREFERRED EMBODIMENTS

Figure 1:
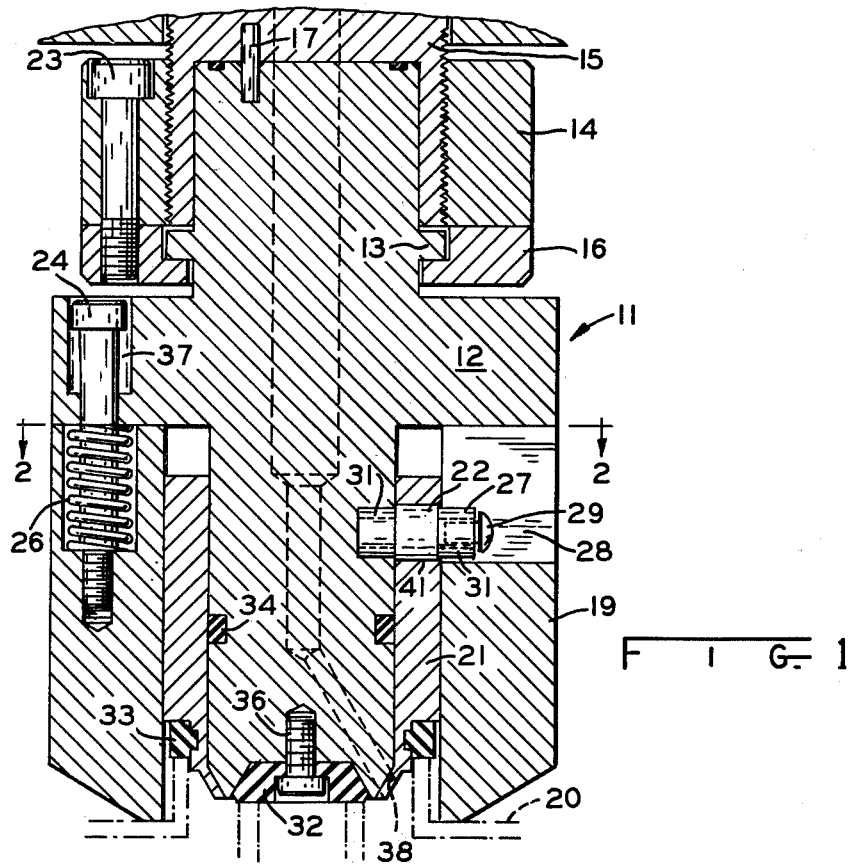
FIG. 1 is a front elevation, with parts removed and parts broken away, and also with parts in section, of apparatus embodying one form of the invention and that may be used to practice the invention in one preferred form thereof.

With general reference now to the drawing, a method is provided for practicing the invention in one form thereof that includes engaging an end frame with a nozzle structure, actuating the nozzle structure due to engagement with the end frame and continued movement of at least part of the nozzle structure, and thereby opening or unblocking the lubricant discharge passages in the nozzle structure. Thereafter, material is extruded through the nozzle discharge passages and then, prior to disengaging a sealing structure from the dynamoelectric machine end frame structure, closure means shear across the extrusion path of the lubricant material so as to close the discharge passages of the nozzle means. This closing action occurs during and as a result of movement of the nozzle structure away from the end frame structure.

With continued reference to the drawing, the apparatus there illustrated will now be described in some detail.

Initially, it is noted that the nozzle structure 11 shown in FIG. 1 may be utilized with the apparatus of the prior art described hereinabove, or with the apparatus in the Tomson and Bohde application or Stoner application referenced hereinabove. For example, the nozle structure 11 may be threaded onto the threaded depending portion of a rotary body 15 of the related applications or an adapter mounted on prior art machines. The nozzle 11 is constructed so that the material dispensing passages which dispense material into an end frame 20 may be positively closed with a shearing action so as to prevent material from seaping or dripping from the nozzle.

The nozzle means of FIG. 1 includes a nozzle body 121 having a flanged portion 13 thereof held fast to the lower end of a rotary body 15 by means of a retainer nut 14 and retainer ring 16. It will also be noted that a dowel pin 17 is utilized to insure that dual discharge paths 18, 19 are in proper alignment and registry with material transferring passages in the rotary body to which the nozzle means is attached. To disassemble the nozzle body 12 from the rotary body 15, it is only necessary to rotate the retainer nut so as to unthread it from the rotary body. Since the retainer ring and retainer nut, when loosened, will permit relative rotation between the nozzle body 12 and the retainer nut and retainer ring, unscrewing the retainer nut from the rotary body 13 will result in removal of the nozzle body 12 from the material dispensing apparatus. Assembly of the nozzle body 12 to the apparatus is accomplished by simply reversing the procedure just described.

The nozzle structure 11 also includes a cam ring 19, a control ring 21, a cam shaft 22, six socket head cap screws 23, four shoulder screws 24, and four springs 26. The cam shaft 22 is a cylindrical structure having a cam lobe 27 which rides in the cam track 28, with the cam shaft being bored at one end thereof in order to retain a retaining rivet 29. A Torrington needle bearing #B-34, denoted by the reference numeral 31, is carried on each end of the cam shaft, and the bearing itself functions as the cam lobe 27.

The nozzle structure 11 also includes rubber (or any other suitable elastomeric material) seals 32, 33 which bear against an end frame during a lubricant injection sub-cycle and prevent leakage of lubricant material therefrom. In addition, an O-ring 34, such as a Parker O-ring #2-214 is utilized to prevent leakage of material upwardly along relatively movable parts as they relatively move as will be described hereinbelow. Finally, it will be noted that any suitable fastener, such as the screw 36 may be utilized to secure the sealing structure, such as the seal 32 to the nozzle body.

Figure 2:
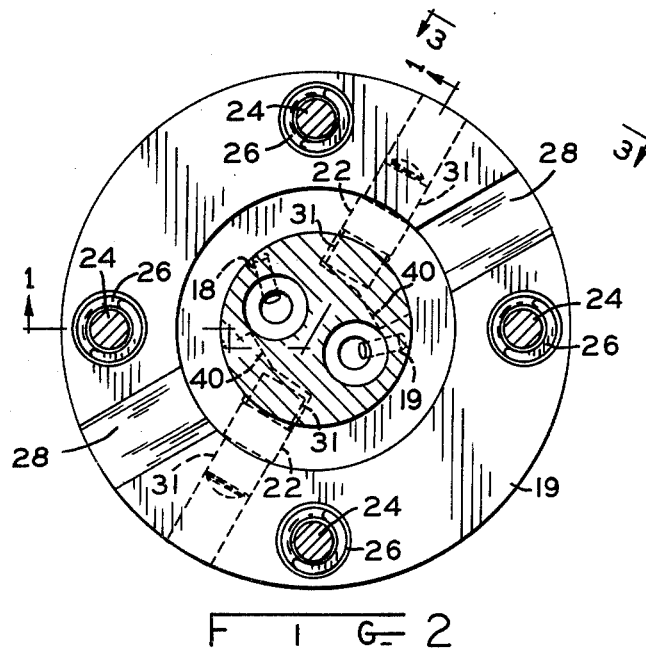
FIG. 2 is a view taken in the direction of the lines 2—2 in FIG. 1 but assuming that FIG. 1 were shown in full.
Figure 3:
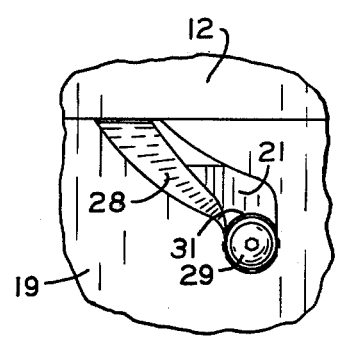
FIG. 3 is a view taken in the direction of the lines 3—3 on FIG. 2.

During operation of the apparatus, the nozzle structure 11 will be moved to its lowermost position with the parts thereof assuming the positions as illustrated in solid lines in FIGS. 1 and 2. At this time, the springs 26 are compressed and the heads of screws 24 have risen in their retaining holes 37 as illustrated. In addition, the cam ring 19 (into which the screws 24 are threaded) is in its uppermost position relative to the nozzle body 12 and the round needle bearing cam lobe 27 will be in the bottom of the cam track 28 as illustrated in FIG. 1. With the parts in this relative position, material transferring passages 38 in the control ring 21 will be aligned with the discharge paths 18, 19 formed in the nozzle body 12; and material may be discharged into the end frame 12. At the end of a dispensing sub-cycle, the rotary body 15 will be raised away from the end frame 20. Then, as the body 12 moves upwardly, springs 26 will expand and cause relative movement between cam ring 19 and nozzle body 12. This relative movement is limited to movement in the axial direction only, because the screws 24 prevent relative rotation from occuring between the cam ring and nozzle body. When the nozzle body 12 has been elevated to its uppermost position, the heads of the screws 24 will bear against the bottom of the screw accommodating holes 37, and the cam ring 19 will have elevated to a point sufficiently far above the end frame 20 to permit removal of the end frame 20 from underneath the nozzle structure.

During the time that relative axial movement is occuring between the cam ring and the nozzle body 12, relative rotary movement will take place between the control ring 21 and the nozzle body 12. This occurs because the cam 22 is press fit into a hole 41 in the control ring 21, but is free to move laterally in slots 40 formed in the nozzle body 12. Thus, as the nozzle body 12 moves upwardly relative to the cam ring 19, the cam shaft 22 is forced to move upwardly in the cam track 28. However, since the cam ring 19 is not permitted to rotate relative to the nozzle body 12, the cam is constrained to follow the cam track 28 and move laterally relative to the nozzle body 12. As the cam undertakes such lateral movement, it forces the control ring 21 to move in a rotary fashion relative to the nozzle body 12. As the control ring moves in this manner, the discharge paths 18, 19, are blocked by the control ring and any material extending from the discharge paths 18, 19 into the end frame 20 is sheared by the control ring as it rotates relative to the nozzle body.

It will now be understood that I have disclosed new and improved apparatus and methods for controlling the flow of dynamoelectric machine lubricating materials wherein linear movement of a nozzle body toward an end frame is converted to rotary movement of nozzle passage flow control means that open passages to permit the discharge of material into an end frame. Moreover, preselected relative movement of the nozzle body and the end frame (in an axial direction) will cause relative rotary movement between the nozzle body and the nozzle passage flow control means. The relative rotary movement of the nozzle passage flow control means and the nozzle body causes the control means to move with a shearing action in a direction transverse to the direction of flow of material being extruded out of the nozzle passages. The apparatus itself, as will be understood, is arranged so that motive force causing axial movement of a nozzle may also cause a concurrent relative rotary movement between the nozzle body and the flow control means.

In view of all of the foregoing, it should now be apparent that novel processes and apparatus for controlling the flow of compressible lubricating materials from nozzle passages have been disclosed which meet the objects, and provide the advantageous features set out hereinabove. Moreover, it should be apparent that modifications in the methods and apparatus particularly described herein may be made by those having ordinary skill in the art without departing from the spirit of the invention.

What I claim as new and desire to secure by Letters Patent of the United States is:

1. A method of controlling the flow of extrudable lubricant material moving from a material dispensing head and into a lubricant reservoir of a dynamoelectric machine end shield while using nozzle means axially movable toward and away from a dynamoelectric machine end shield wherein the nozzle means includes a nozzle body having at least one material discharge path and also includes closure means; the method comprising: holding the closure means in passage blocking relationship with the at least one material discharge path while axially moving the nozzle means toward a dynamoelectric machine end frame; engaging the dynamoelectric machine end frame with at least a portion of the nozzle means and thereupon effecting concurrent relative axial movement of the nozzle body with respect to the end frame and relative rotary movement between the closure means and nozzle body, and exposing the at least one discharge opening to the end frame; expelling lubricant material from the discharge path into the end frame along a flow path; and thereafter concurrently moving the nozzle means axially away from the dynamoelectric machine end frame while effecting relative rotary movement between the closure means and the nozzle body, and thereby again blocking the discharge path by shearing material being expelled from the discharge path by moving the closure means transversely across the flow path of the lubricant material.

2. The method of claim 1 further including sealingly engaging the dynamoelectric machine end frame with the nozzle means as the nozzle means engages the dynamoelectric machine end frame.

3. The method of claim 2 wherein sealing engagement of the nozzle means and end frame is maintained at least until after the closure means again blocks the material discharge path.

4. The method of claim 3 wherein the step of again blocking the material discharge path is effected during and as a result of movement of the nozzle means axially away from the end frame structure.

5. Apparatus for controlling the flow of extruded lubricant material from nozzle means to a bearing lubricant reservoir whereby the material flow path of the extruded lubricant material is interrupted by shearing the material in a direction transverse to the direction of material flow; said nozzle means comprising: a nozzle body having at least one material discharge passage disposed therein; control means for selectively blocking and unblocking the at least one material discharge passage; and cam means for selectively moving the control means from passage blocking to passage unblocking relative positions; said cam means being operable for causing relative movement of the control means and nozzle body in response to relative movement between the cam means and nozzle body.

6. The apparatus of claim 5 wherein the nozzle body includes means for sealingly engaging a dynamoelectric machine end frame.

7. The apparatus of claim 5 wherein the nozzle means includes a mounting ring for mounting the nozzle body on a preselected dispensing head.

8. The apparatus of claim 5 wherein the cam means includes a cam ring having a cam track formed therein; the control means comprises a control ring having a camming member fixedly carried thereby; and wherein the control ring moves in response to interaction of the cam track and camming member so that the control ring moves relatively with respect to the cam ring and with respect to the nozzle body.

* * * * *